(12) United States Patent  (10) Patent No.: US 7,422,205 B2
Akiyama et al.  (45) Date of Patent: Sep. 9, 2008

(54) ORIGINAL FEEDING APPARATUS AND IMAGE READING APPARATUS

(75) Inventors: Mamoru Akiyama, Yamanashi-ken (JP); Eiichi Kubo, Yamanashi-ken (JP); Sei Takahashi, Yamanashi-ken (JP); Junko Kurakane, Yamanashi (JP)

(73) Assignee: Nisca Corporation, Minamikoma-gun, Yamanashi-ken (JP)

( * ) Notice: Subject to any disclaimer, the term of this patent is extended or adjusted under 35 U.S.C. 154(b) by 456 days.

(21) Appl. No.: 11/101,480

(22) Filed: Apr. 8, 2005

(65) Prior Publication Data

US 2005/0225022 A1    Oct. 13, 2005

(30) Foreign Application Priority Data

Apr. 9, 2004   (JP) ............................. 2004-115602

(51) Int. Cl.
    *B65H 3/06*   (2006.01)
(52) U.S. Cl. ...................... 271/118; 271/114; 271/110; 271/270
(58) Field of Classification Search ................ 271/118, 271/110, 270, 114
    See application file for complete search history.

(56) References Cited

U.S. PATENT DOCUMENTS

| | | | | | |
|---|---|---|---|---|---|
| 4,873,541 | A | * | 10/1989 | Hirose et al. ................ | 347/118 |
| 4,901,117 | A | * | 2/1990 | Derrick ...................... | 399/202 |
| 5,224,693 | A | * | 7/1993 | Taguchi et al. ............. | 271/9.11 |
| 5,423,526 | A | * | 6/1995 | Hasegawa ................ | 271/10.13 |
| 5,488,464 | A | * | 1/1996 | Wenthe et al. ............. | 399/396 |
| 5,628,503 | A | * | 5/1997 | Ishikawa ..................... | 271/4.1 |
| 5,775,823 | A | * | 7/1998 | Bekki et al. ................ | 400/629 |
| 5,988,628 | A | * | 11/1999 | Mori ........................... | 271/117 |
| 6,005,687 | A | * | 12/1999 | Kawashima et al. ........ | 358/498 |
| 6,024,356 | A | * | 2/2000 | Tanaka et al. .......... | 280/11.214 |
| 6,131,898 | A | * | 10/2000 | Hiroi et al. ............... | 271/10.03 |
| 6,257,569 | B1 | * | 7/2001 | Rhodes et al. ............. | 271/117 |
| 6,390,463 | B1 | * | 5/2002 | Iwago ....................... | 271/118 |
| 6,786,481 | B2 | * | 9/2004 | Kawai et al. ................ | 271/109 |
| 7,338,042 | B2 | * | 3/2008 | Shimizu ..................... | 271/110 |
| 2002/0084574 | A1 | * | 7/2002 | Kim ........................... | 271/118 |

OTHER PUBLICATIONS

Patent Abstracts of Japan; Publication No. 2002-179266; Date of Publication: Jun. 26, 2002; Applicant: Nisca Corporation.

(Continued)

*Primary Examiner*—Patrick Mackey
*Assistant Examiner*—Prasad V Gokhale
(74) *Attorney, Agent, or Firm*—Manabu Kanesaka

(57) ABSTRACT

An original feeding apparatus includes a feeder tray for stacking originals, a separating device for separating the originals into a single sheet, and a feeding device for feeding the original to the separating device. The feeding device is raised or lowered between a feeding position where the feeding device contacts an uppermost original stacked on the feeder tray, and a retracted position where the feeding device is separated from the uppermost original. A drive device and a control device are disposed for raising and lowering the feeding device. The control device adjusts a rotating speed of the drive device for raising and lowering the feeding device according to a reading mode, so that the feeding device is lowered at a different speed to touch the uppermost original.

12 Claims, 12 Drawing Sheets

OTHER PUBLICATIONS

Patent Abstracts of Japan; Publication No. 2001-220026; Date of Publication: Aug. 14, 2001; Applicant: Ricoh Co., Ltd.

Patent Abstracts of Japan; Publication No. 2001-130763; Date of Publication: May 15, 2001; Applicant: Ncanon Inc.

Patent Abstracts of Japan; Publication No. 08-295427; Date of Publication: Dec. 11, 1996; Applicant: Sharp Corporation.

Patent Abstracts of Japan; Publication No. 05-162870; Date of Publication: Jun. 29, 1993; Applicant: Toshiba Corp; Toshiba Inteligent Technol. Ltd.

* cited by examiner

Fig. 12 Prior Art
A3T 52.3g
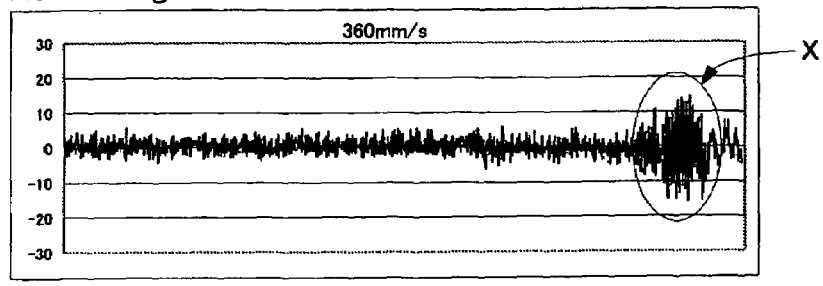
A3T 52.3g
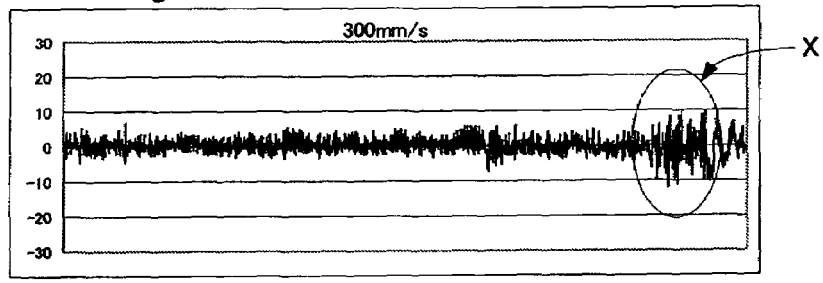
A3T 52.3g
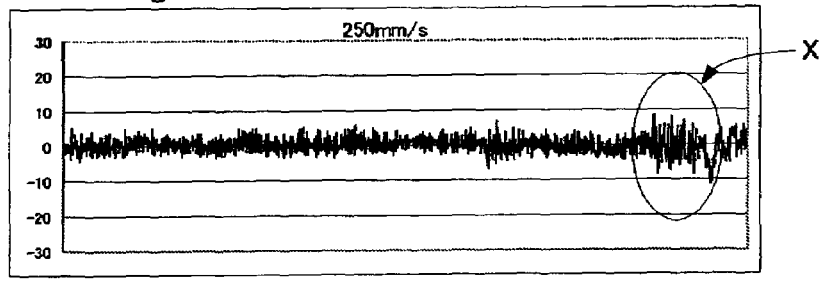
A3T 52.3g
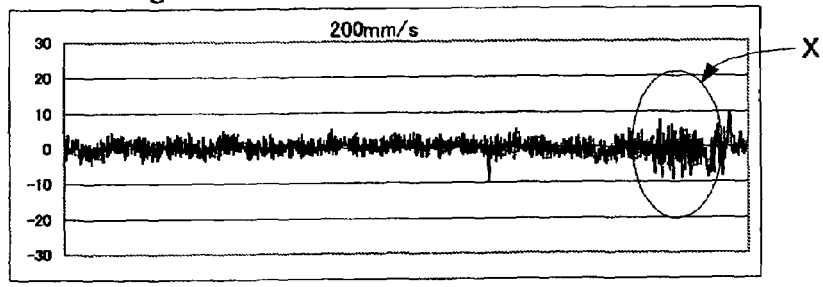
A3T 52.3g
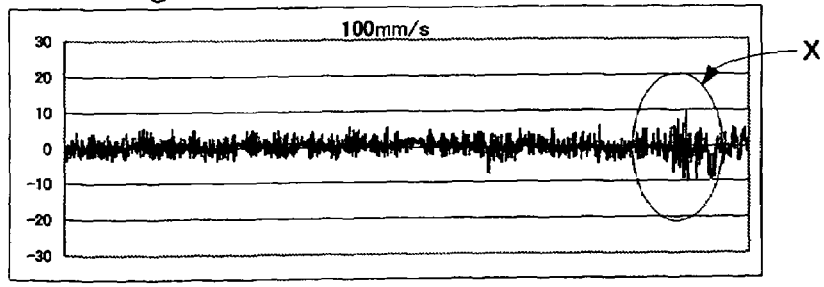

ORIGINAL FEEDING APPARATUS AND IMAGE READING APPARATUS

BACKGROUND OF THE INVENTION AND RELATED ART STATEMENT

The present invention relates to an original feeding apparatus for sequentially feeding an original to an image reading platen of an image reading apparatus such as a copier, facsimile, or scanner. The present invention also relates to an image reading apparatus provided with the original feeding apparatus.

An image reading apparatus such as a copier, facsimile, or scanner sequentially reads an original placed on a platen using a solid state imaging device such as a CCD. An original feeding apparatus is provided for separating originals stacked on a feeder tray into a single sheet and feeding them sequentially to a platen.

Conventionally, in such an original feeding apparatus, a separating device is formed of a pair of rollers rotating in forward and reverse directions, or a roller and a friction pad, and separates originals stacked on a feeder tray into a single sheet. A transport device (such as rollers or a belt) with a register roller is arranged in a feeding path for feeding the original to a platen. A feeding device such as a kick roller is disposed above the feeder tray for kicking out the uppermost sheet to a separating roller (separating device). The feeding device is raised and lowered between a kicking position where the feeding device contacts the uppermost original on the tray (a kicking position) and a retracted position where the feeding device is away from the kicking position.

When the separating device separates the original, the feeding device contacts and kicks out the uppermost sheet on the tray. After the separating device separates the original, when the transport device such as a register roller feeds the original toward the platen, the feeding device retracts away from the sheet to reduce a load on the sheet. Therefore, the kick roller is repeatedly raised and lowered in up and down directions between the retracted position above the feeder tray and the kicking position for each cycle of feeding the original.

In view of efficiency of a reading process, the originals on the tray are fed consecutively to the platen at a predetermined interval. In other words, while one original is read at the platen, the next original is fed from the feeder tray. Japanese Patent Publication (Kokai) No. 2002-179266 discloses a conventional feeding apparatus including a kick roller, a separating roller, a register roller, and a transport roller arranged in this order from the feeder tray to the platen. A motor capable of both forward and reverse rotations lowers the kick roller from a retracted position to a kicking position through a forward drive, and simultaneously drives the kick roller and the separating roller to separate the uppermost sheet on the tray to feed the sheet to the register roller. The motor raises the kick roller to the retracted position with a reverse drive, and simultaneously drives the register roller to separate the originals into a single sheet and then feed the uppermost sheet toward the platen. The single motor is provided for raising and lowering the kick roller in the up and down directions with the forward and reverse rotations, thereby making the structure simple.

In the conventional apparatus, when the drive device such as a motor and solenoid raises and lowers the kick roller in the up and down directions or the kick roller lowers under its own weight, the kick roller always strikes the sheets stacked on a feeder tray with a constant speed. Accordingly, when the kick roller is lowered to the sheet feeder tray (from the retracted position to the kick position), an impact and sound of the striking are repeated. In order to reduce the impact and sound generated when the kick roller strikes the sheet, it is possible to lower the kick roller to the sheet surface gently at a slower speed, or to reduce a speed of the kick roller just prior to the striking.

When the kick roller is lowered at a slower speed, it takes long time to feed the sheet, thereby lowering efficiency of the reading process. When a speed of the kick roller is reduced just prior to the striking, it is difficult to reduce a stroke for raising and lowering the kick roller between the retracted position and the kicking positions. Accordingly, it is difficult to make the apparatus compact. As a result, it is necessary to lower the kick roller arranged above the sheet feeder tray at a constant speed to the kicking position where the kick roller touches the surface of the sheet.

An image reading apparatus such as a scanner reads various types of originals in a color mode, black-and-white mode, or gray scale mode. It has been required to read the originals at a high resolution such as 600 dpi and 1200 dpi. It has been also required to read the originals at a higher speed. Accordingly, it is preferable to consecutively feed sheets stacked on a feeder tray to a platen with a short interval at a speed according to a reading mode. In the color mode, three line sensors of R, G, and B arranged separately read a moving original. In this case, if the original is fed unevenly, or a small impact (or vibration) is applied to an apparatus, a read image becomes blurred. Accordingly, it is difficult to read an image with high reproducibility at a high resolution without blurring or distortion of an image.

In an image reading apparatus having such a feeding mechanism, when an original is fed from a feeder tray at a high speed, it is difficult to read the original at a high resolution in the color mode without blurring or distortion of an image. When the original is fed at a low speed, it is difficult to increase reading efficiency and processing efficiency, especially in the black-and-white mode or at a low resolution.

It has been found that the color blurring and distortion of an image in the color mode or at a high resolution are related to an operation of feeding a next original from a feeder tray. In particular, when a kick roller is lowered and collides with the feeder tray, an impact generates a vibration, which becomes a major factor of the problems.

FIG. 12 shows experimental results showing that the image blurring occurs when a kick roller strikes an original on a feeder tray. In the experiment, the kick roller collided with an upper surface of the original at various speeds from 100 mm/sec to 360 mm/sec. Three sheets of chart paper with a weight of 52.3 grams were placed on the feeder tray. When a second original is kicked out, a shift of an image on a first original was measured. The horizontal axis represents time and the vertical axis represents a percentage of the shift of the image relative to lines with 0.4 mm spacing of the chart paper. A symbol X represents a point when the kick roller collided with the original.

It is clear from the results that the reading platen vibrated by a magnitude substantially proportional to a speed of the kick roller colliding with the originals on the feeder tray. The vibrations moved the original on the platen upwardly and downwardly, thereby causing the blurring and the distortion of image on the original. When a feeding device is lowered to contact an original on a feeder tray at a different speed according to an image reading mode for sequentially feeding the original from the feeder tray to a reading platen, it is possible to reduce the blurring and the distortion of an image.

In view of the problems described above, an object of the present invention is to provide an original feeding apparatus for sequentially feeding an original to an image reading platen at a speed according to a reading mode. Accordingly, it is possible to obtain an image with high quality colors at a high resolution.

Another object of the present invention is to provide an image reading apparatus provided with such an original feeding apparatus.

Further objects and advantages of the invention will be apparent from the following description of the invention.

SUMMARY OF THE INVENTION

In order to attain the objects described above, according to the present invention, an original feeding apparatus includes a feeder tray for stacking originals; a separating device such as a separation roller disposed at a leading end of the feeder tray for separating the originals into a single sheet; and a feeding device such as a kick roller disposed at the leading end of the feeder tray for feeding the original to the separating device. The feeding device is supported to rise and lower between a feeding position where the feeding device contacts the originals stacked on the feeder tray, and a retracted position where the feeding device is separated from the originals. A drive device and a control device thereof are disposed for raising and lowering the feeding device. The control device adjusts a rotating speed of the drive device for raising and lowering the feeding device according to a reading mode, so that the feeding device is lowered at a different speed to touch the originals on the feeder tray. Accordingly, it is possible to select a speed for the kick roller to touch the originals on the feeder tray according to the reading mode.

According to the present invention, it is arranged such that the feeding device is lowered at a low speed when reading color originals, and/or using a resolution of 600 dpi or higher, thereby making control simple. Conversely, the feeding device is lowered at a high speed when reading black-and-white originals, and/or using a resolution lower than 600 dpi.

In the present invention, when the original is sequentially fed from the feeder tray to the reading platen in a color mode and/or at a high resolution, the feeding device such as a kick roller arranged above the feeder tray is lowered at a low speed to contact the original stacked on the feeder tray. Accordingly, it is possible to reduce blurring and distortion due to vibrations.

According to the present invention, a stopper device may be provided for stopping the feeding device at the retracted position. The drive device is controlled such that the feeding device collides with the stopper device at a different speed according to the reading mode, thereby reducing an influence of an impact of the feeding device colliding with the stopper device on the image.

BRIEF DESCRIPTION OF THE DRAWINGS

FIG. 12 shows experimental results of image blurring when a kick roller collided with an original on a feeder tray.

DETAILED DESCRIPTION OF PREFERRED EMBODIMENTS

Figure 1:
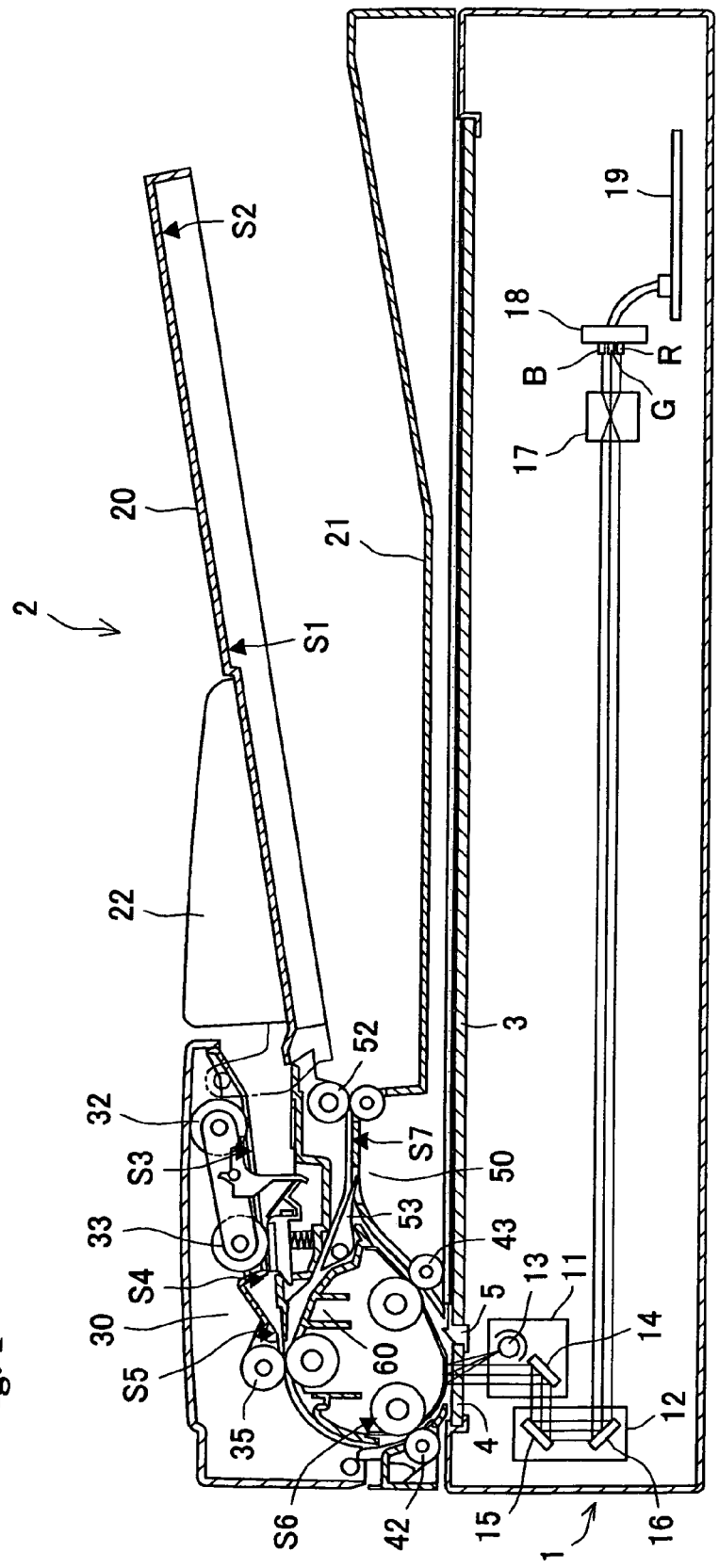
FIG. 1 is a sectional view of an original reading apparatus with an original feeding apparatus according to an embodiment of the present invention.
Figure 2:
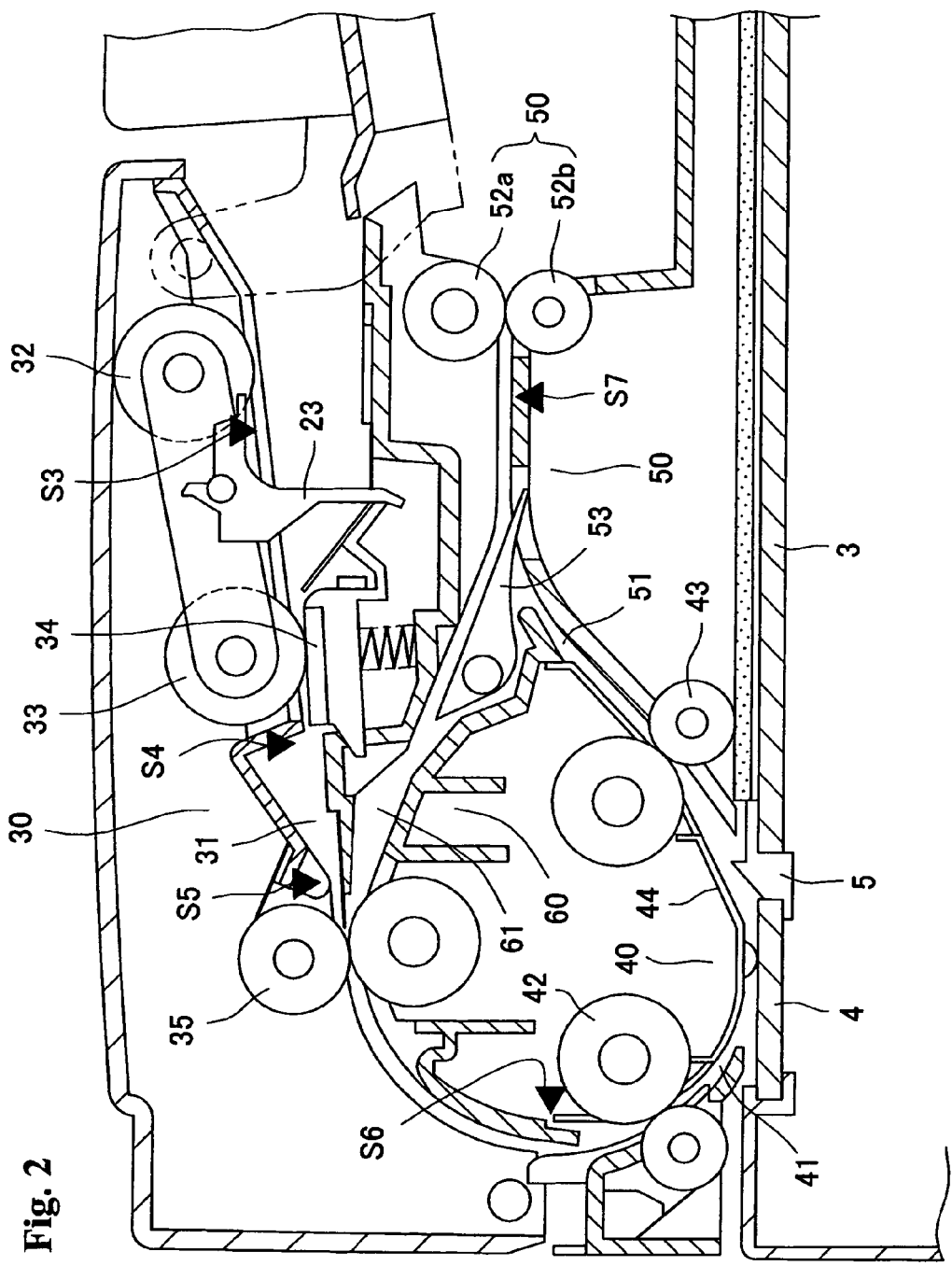
FIG. 2 is an enlarged sectional view showing a main portion of the original feeding apparatus.

Hereunder, embodiments of the present invention will be explained with reference to the accompanying drawings. FIG. 1 is a sectional view of an original reading apparatus and an original feeding apparatus according to an embodiment of the present invention. FIG. 2 is a sectional view of a main portion of the original feeding apparatus.

As shown in FIG. 1, an original feeding apparatus 2 is mounted on an original reading apparatus unit 1. The original feeding apparatus 2 transports originals to pass over a top surface of a platen disposed in the apparatus unit 1.

The original reading apparatus 1 has a book original reading mode that moves a first and a second optical carriages 11 and 12 of a reading device (described below) to read an original manually placed on the first platen 3; and a sheet original reading mode wherein the first and the second optical carriages 11 and 12 are stationary to read a sheet original that is moved over a second platen glass 4 by the original feeding apparatus 2.

The reading device comprises a first carriage 11 that is provided with a light source 13, such as a xenon lamp, for irradiating light on the original, and a first mirror 14 to guide the light reflected from the original; a second carriage 12 that is provided with a second mirror 15 for guiding light reflected from the first mirror 14 and a third mirror 16 for guiding light reflected from the second mirror 15; a condenser for condensing light reflected from the original guided via the first mirror 14, the second mirror 15, and the third mirror 16; three line sensors 18 that photo-electrically convert the received reflected light; and a processing board 19 (control board) that converts analog signals into digital signals from the line sensors 18 and delays signals so that it can combine all three signals of R, G and B into the same line information.

A reading operation of the reading device will be explained next. When the system is set to the book original reading mode for reading an original manually placed on the first platen 3, a sub-scanning motor (not shown) moves the first carriage 6 and the second carriage 7 at a speed having a ratio of 2 to 1. Light irradiated from the light source 13 onto the original manually placed on the first platen 3 is reflected at the original and enters the three lines sensors 18 disposed in a line shape via the first mirror 14, the second mirror 15, the third mirror 16 and the lens 17. Then, the incident light is photo-electrically converted to read information (image information) on the original.

Conversely, when the system is set to a sheet original reading mode that reads originals as they pass over the second platen 4, the first carriage 11 and the second carriage 12 are stationary below the second platen 4. Light from the light source irradiates the original passing over the platen by the original feeding apparatus 2. The light reflected at the original is incident on the line sensor 18 by the first mirror 14, the second mirror 15, the third mirror 16, and the lens 17. In the same way as in the book original reading mode, the incident light is photo-electrically converted by the three lines sensors to read the information (image information) on the original.

An A/D converter converts the analog signals as the original information photo-electrically converted by the three line sensors into digital signals. After predetermined image processes are applied thereto, the information is sent to an image forming apparatus (not shown). Then, images are formed on a recording paper in the image forming apparatus based on the image data received.

Line sensors R, G and B are arranged in parallel on a monolithic substrate as the three line sensors 18. The size of the pixels on each are approximately 7 μm×7 μm (or 10 μm×10 μm, or 14 μm×14 μm). The spacing of the lines of each sensor is approximately 10 to 20 times larger than the size of each pixel (approximately 0.1 to 0.2 mm). Because of the gaps between the three sensors, it is not possible to read the same position on the original surface simultaneously with each sensor. For example, when the R sensor of the line sensors 18 reads the information on the scanning line N, the G sensor reads the information on the scanning line N−1, and the B sensor reads the information on the scanning line N−2 to obtain color information for all three of the scanning lines N for R, G and B, the reading device scans further, so that the G sensor and the B sensor read the information on the scanning lines N. Then, a delaying process combines each of the information delayed.

The original feeding apparatus 2 comprises a feeder tray 20 that is capable of stacking a plurality of originals; a feeder unit (feeding device) 30 for separating originals into single sheet and feeding them one at a time from the feeder tray 20 toward the second platen 4; a transporting unit 40 for passing an original over the second platen 4; a discharge unit 50 for receiving an original passing over the second platen 4 and discharging it; and a discharge tray 21 for storing originals discharged from the discharge unit 50. Additionally, the original feeding apparatus 2 is provided with a switchback unit 60 that switches back an original discharged from the second platen 4 at the discharge unit 50 and then feeds it to the feeding unit 30 and the second platen 4 again. Note that the original tray 20 is somewhat oblique to ensure a space therebetween the top area of the discharge tray 21.

Sides of the originals stacked on the feeder tray 20 are aligned by a side guide 22, and leading edges are aligned by a stopper 23. The feeding unit 30 is provided with a separating device comprising a raising and lowering kick roller 32 that lowers to touch the uppermost original stacked on the feeder tray 20 to feed an original, a feed roller 33 that feeds originals fed by the kick roller 32, and a separating pad 34 that allows only one sheet of the uppermost original to pass and stops the second and subsequent sheets from being fed; and a pair of register rollers 35 that abuts against the leading edge of the original separated into a single sheet by the separating device to align the leading edge of the original before feeding it downstream along the paper feed path 31.

Figure 5:
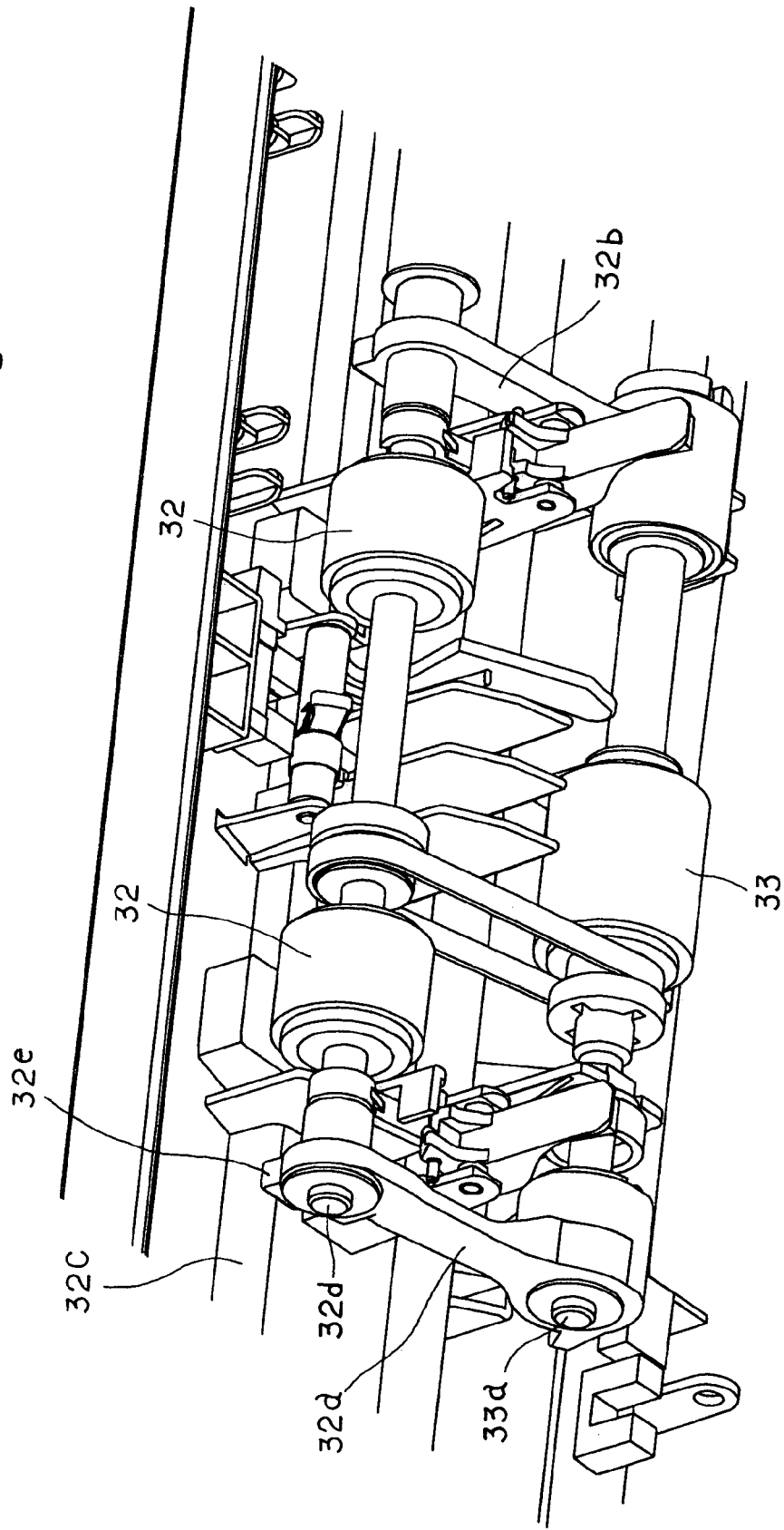
FIG. 5 is a perspective view showing a kick roller raising and lowering mechanism in the original feeding apparatus.

The raising and lowering mechanism of the kick roller 32 will be explained next based on FIGS. 5 and 6(a) to 6(c). As shown in FIG. 5, the drive shaft 32d of the kick roller 32 is rotatably supported on a pair of raising and lowering arms 32a and 32b, and the raising and lowering arms 32a and 32b are mounted to a drive shaft 33a of the feed roller 33. The raising and lowering arms 32a and 32b are configured to be rotated by the rotation of the drive shaft 33a of the feed roller 33. The raising and lowering arms 32a and 32b rotate by the forward and reverse drive of the feed motor MT1 to raise and lower the kick roller 32.

Figure 6A:
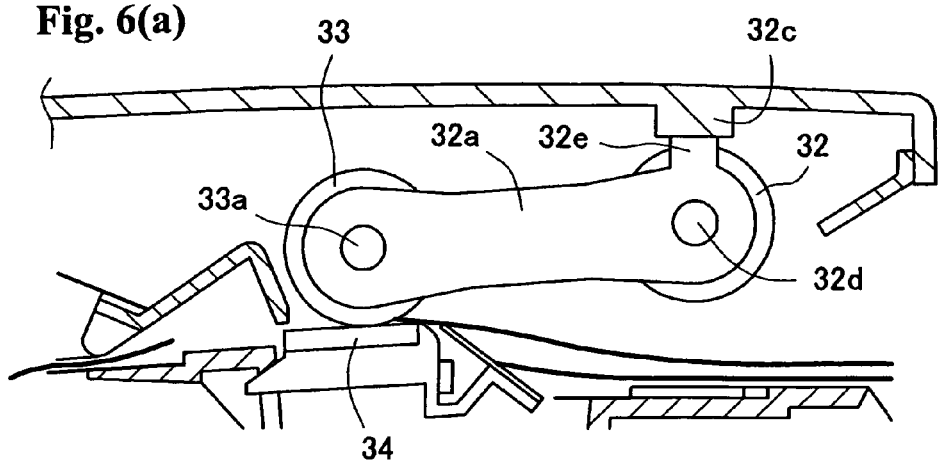
FIGS. 6(a), 6(b), and 6(c) are views showing a raising and lowering action of the kick roller in the original feeding apparatus.
Figure 6B:
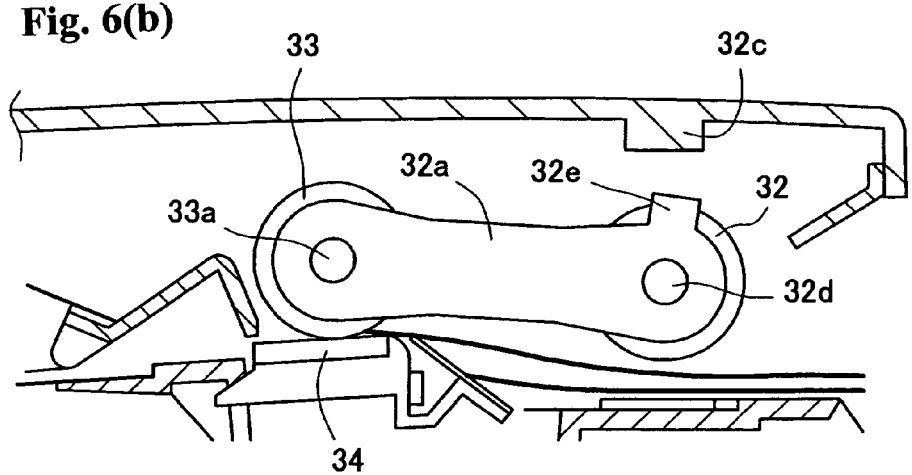
Figure 6C:
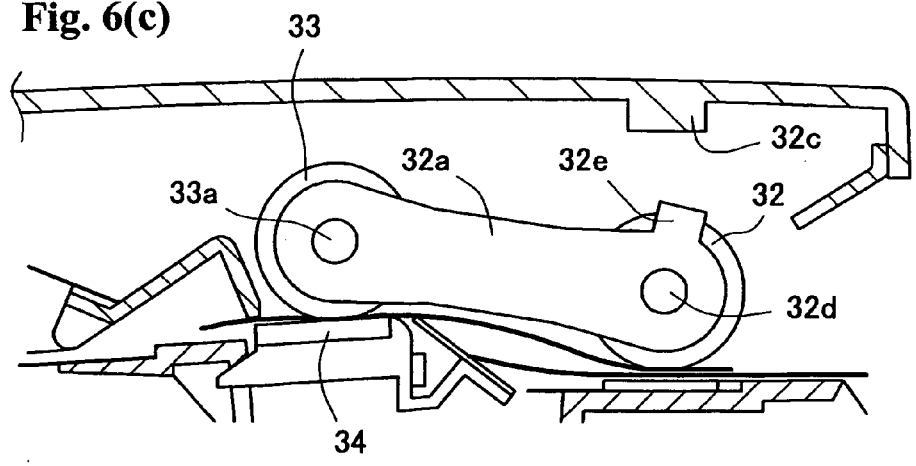

The raising and lowering mechanism of the kick roller 32 will be explained in further detail in reference to FIG. 6(a). When the feed motor MT1 is driven in the forward direction while the kick roller is at its upper limit position, the rotational drive is transmitted to the drive shaft 33a of the feed roller 33 to rotate the drive shaft 33a of the feed roller 33 in a direction to feed an original. Along with that, the raising and lowering arms 32a and 32b lower the kick roller while rotating in the direction of the upper surface of the originals stacked on the feeder tray 20 (downwardly, see FIG. 6(b)). Then, the lowering kick roller 32 touches the upper surface of the original, as shown in FIG. 6(c), where the lowering of the feed roller 32 stops. This causes a predetermined torque to be generated in the drive shaft 33a of the feed roller 33. The spring clutches CL1 and CL2 are activated by the torque. This causes the raising and lowering arms the 32a and 32b to idle on the drive shaft 33a of the feed roller 33, and the kick roller 32 is held while touching the upper surface of the original.

When the motor MT1 rotates in the reverse direction, the rotating shaft 33a on the feed roller 33 rotates in a direction opposite to the original feeding direction. Then, along with the reverse rotation of the drive shaft 33a of the feed roller 33, the raising and lowering arms 32a and 32b rotate in a direction that separates from the upper surface of the originals on the feeder tray 20 (in the upper direction) to raise the kick roller 32. A protrusion 32e formed on the upper side of the pair of raising and lowering arms 32a and 32b rotating in the upper direction, as shown in FIG. 5, strikes a restricting portion 32c formed on the feeder cover. This stops the rotation of the arms. This causes a predetermined torque to be generated in the drive shaft 33a of the feed roller 33. This torque activates the spring clutches CL1 and CL2 which cause the raising and lowering arms 32a and 32b to idle on the drive shaft 33a of the feed roller 33. This in turn causes the kick roller 32 to idle in its upper limit position where it touches the restricting portion 32 C on the original feeder cover.

The transport unit 40 comprises a pair of transport in rollers 42 at an upstream side of the second platen 4 for feeding originals thereto, and a pair of discharge rollers 43 at a downstream side of the second platen 4 for discharging originals. The unit transports originals along a second platen 4 on the apparatus 1 side, the lifter guide 5, and the transport path 41 formed by a white backup guide 44 on the original feeding apparatus 2 side.

The discharge unit 50 and the switchback unit 60 share a portion of the discharge tray 21. A pair of discharge rollers 52 that discharges originals to the discharge tray 21 is disposed on the shared portion. The pair of discharge rollers 52 is controlled to rotate in reverse while nipping a trailing end of an original to switch it back and send it to the feed unit 30 in a duplex mode (described below). These components are configured so that the discharge follower roller 52b separates from the discharge drive roller 52a, and the leading and trailing ends of an original being circulated from the switchback unit 60 via the feed unit 30 and transport unit 40 do not interfere with each other when passing. There is also a flapper 53 for guiding an original into the feed unit 30 disposed on the portion shared by the discharge unit 50 and the switchback unit 60. The flapper 53 is constantly urged downwardly by an urging spring (not shown). When an original is fed to the pair of discharge rollers 52 along the discharge path 51, the leading edge of the original raises the flapper upwardly to allow the original to pass. When the pair of discharge rollers 52 switchbacks the original, the flapper is positioned downwardly to cover the discharge path 51 to guide the original into the switchback path 61.

A drive mechanism for each roller will be explained next. According to the embodiment of the present invention, the drive mechanism is composed of a feed drive unit comprising a feed motor MT1 that is capable of both forward and reverse drives, and a transmission mechanism (transmission device) for transmitting the drive of the feed motor MT1 to the kick roller 32, the feed roller 33, and the pair of register rollers 35; and a transport drive unit composed of a transport motor MT2, and a transmission mechanism for transmitting the drive of the transport motor MT2 to a pair of transport in rollers 42, a pair of transport out rollers 43, and a pair of discharge rollers 52 of the discharge unit 50.

Figure 3:
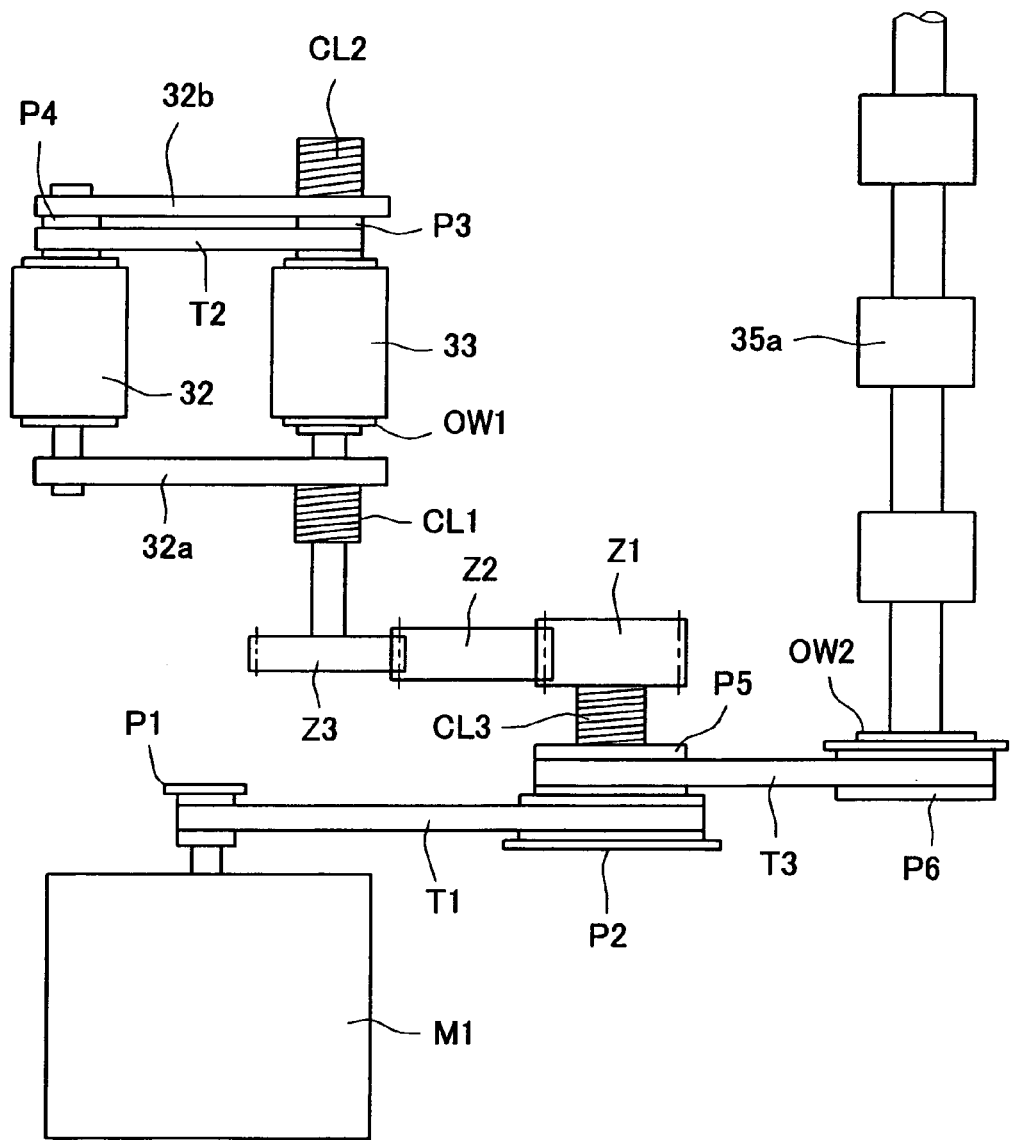
FIG. 3 is a view showing a drive transmission mechanism of a sheet feeding drive unit in the original feeding apparatus.

In the feed drive unit shown in FIG. 3, the forward rotational drive of the feed motor MT1 is transmitted from a pulley P1 to a pulley P2 via a timing belt T1. The drive from the pulley P2 is then transmitted in order to the gear Z1, the gear Z2, and to the gear Z3 that is mounted on the drive shaft of the feed roller 33, thereby rotating the feed roller 33 in a direction to feed an original. The pulley P3 is disposed on the drive shaft of the feed roller 33 to also transmit drive to the kick roller 32 via the timing belt T2 that is trained therebetween with the pulley P4 disposed on the kick roller 32 shaft. Also, one end of each of the rising and lowering arms 32*a* and 32*b* that support the kick roller 32 is mounted to the drive shaft of the feed roller 33. The rising and lowering arms 32*a* and 32*b* are rotated by the rotation of a drive shaft in the paper feed direction (the forward rotational drive provided by the feed motor MT1) to cause the kick roller 32 to lower and touch the original. The actions of spring clutches CL1 and CL2 cause the drive shaft of the feed roller 33 to idle with regard to the rising and lowering arms 32*a* and 32*b*. At this time, although the registration drive roller 35*a* is interlocked by a timing belt T3 that is trained between the pulley P6 disposed on the drive shaft and the pulley P5 disposed on the same shaft as the pulley P2, it does not rotate because of the action of the one-way clutch OW2 disposed in the pulley P6.

The reverse drive of the feed motor MT1 is transmitted from the pulley P1 to the pulley P2 via the timing belt T1, and then transmitted from the pulley 5 disposed on the same shaft as the pulley P2 to the pulley P6 mounted on the shaft of the registration drive roller 35*a* via the timing belt T3 to rotate the registration drive roller 35*a* in the paper feed direction. At this time, the reverse rotational drive of the feed motor MT1 is also transmitted to the drive shaft of the feed roller 33 to raise the kick roller 32 by rotating the rising and lowering arms 32*a* and 32*b* in the counterclockwise direction. The feed roller 33 does not rotate because of the action of the one-way clutch OW1 which is disposed therein. The raised rising and lowering arms 32*a* and 32*b* touch the restricting member 32*c*, as shown in FIG. 5, where the action of the spring clutch CL3 causes the drive shaft of the feed roller 33 to idle on the rising and lowering arms 32*a* and 32*b*.

In the transport drive unit, the forward and reverse drives of the transport motor MT2 are transmitted to a pair of transport in rollers 42 and one of the pair of transport out rollers 43 to drive the pair of transport in rollers 42 and a pair of transport out rollers 43 at substantially the same speed. The forward and reverse drives of the transport motor MT2 are transmitted to the discharge drive roller 52*a* of the pair of discharge rollers 52 to drive the pair of discharge rollers 52 in forward and reverse directions.

A pressing solenoid SOL is disposed as a drive source to separate the pair of discharge rollers 52 that is so configured. The pressing solenoid SOL is configured to move the discharge follower roller 24*b* to a position separated from the discharge drive roller 24*a* when it is energized (ON), and to allow an urging spring to urge the discharge follower roller 24*b* to the side of the discharge drive roller 24*a* when it is not a energized (OFF).

A plurality of sensors S1 and S2 is disposed in the original feeding direction on the original tray 15 to detect the length of originals placed on the original tray by turning on or off. By detecting the width direction of originals stacked on the feeder tray 20 from the change in the volume caused by the amount of movement of the side guide 22, the size of the original can be determined based on the output of the width detection and the length of the original as detected by the plurality of sensors S1 and S2.

The empty sensor S3 that detects that originals are stacked on the feeder tray 20; the post-separation sensor S4 and the register sensor S5 that detect the trailing edge of an original being fed in the paper feed path 31; the read sensor S6 that detects the trailing edge of the original, disposed in front of the second platen 4; and the discharge sensor S7 that detects the trailing edge of an original being discharged from the second platen 4 are all disposed in the path that guides originals.

Figure 4:
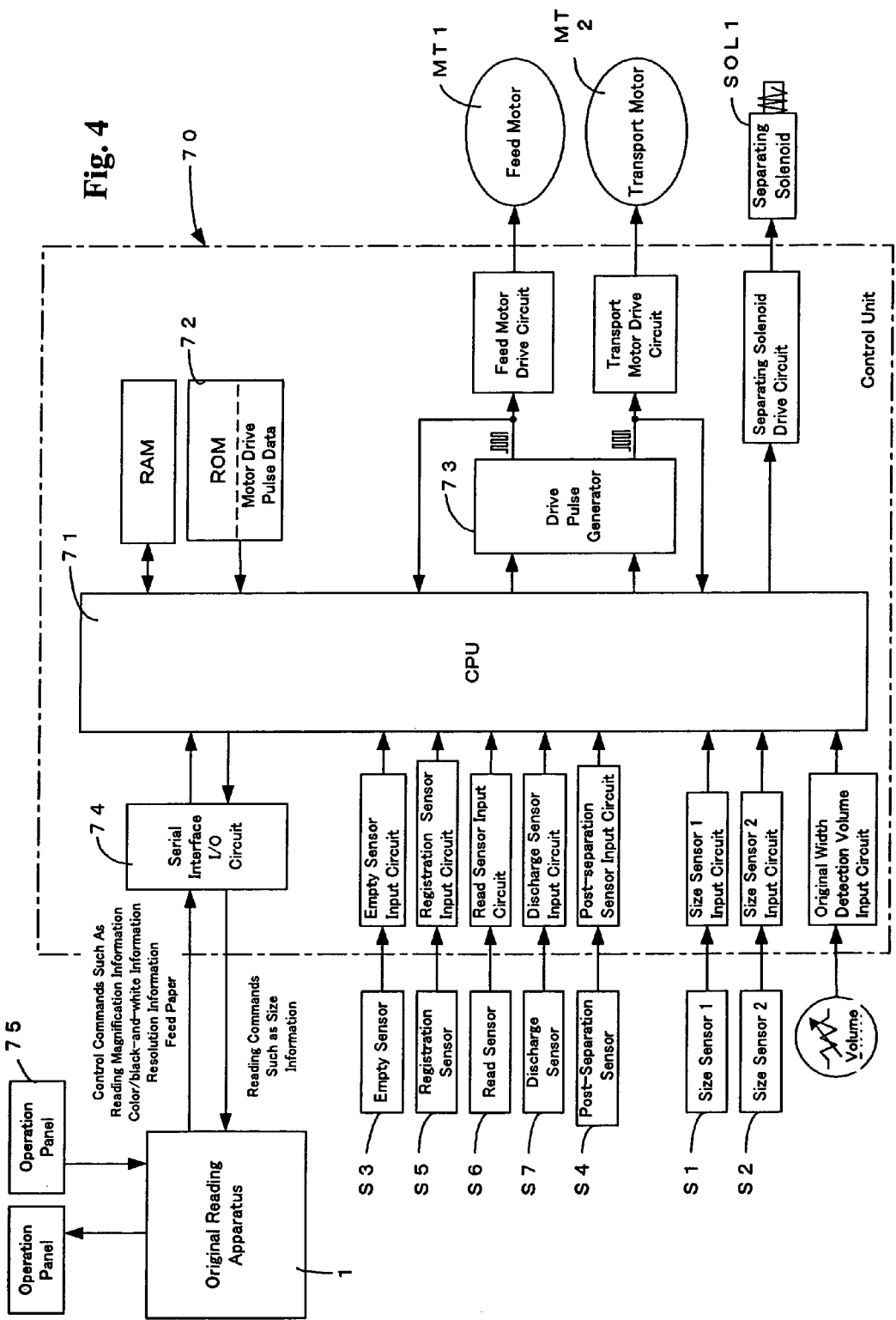
FIG. 4 is a block diagram showing a control system of the original feeding apparatus and the original reading apparatus.

Each of the sensors S3 to S7 is connected to a CPU 71 that is mounted on a control board 70 as a control device for controlling the drive of the overall apparatus via input circuits as shown in FIG. 4. The drives of each motor MT1 and MT2 and the separating solenoid SOL1 are controlled according to detection signals from each of the sensors.

A configuration for the control system in the original feeding apparatus 2 will be explained with reference to FIG. 4. An I/O circuit 74 for serial interface is connected by a communication cable with the control unit in the original reading apparatus mounted on the control board 70. Reading condition information including single side or duplex originals, color or black-and-white originals, and resolution or various commands such as paper feed instructions set by an input unit on the control panel 75 on the original reading apparatus 1 are obtained by the CPU 71. The serial interface I/O circuit 74 sends original size information, original error information, and various commands, so that the reading device can start reading to the regional reading apparatus 1. Note that it is also possible for an operator to make selections for information on image reading conditions such as whether the original is color or black-and-white and the resolution using an external device such as a personal computer disconnected to the image reading apparatus instead of the input unit such as the operation panel which is disposed on the image reading apparatus.

The feed motor MT1 and transport motor MT2 are pulse motors. Current from each drive circuit is supplied according to the pulse signals from a drive pulse generator 73 to drive each motor. The CPU 71 executes operating programs that are stored in an ROM 72 according to the information such as the reading magnification, color or black-and-white, and resolution received from the control unit in the original reading apparatus 1. Note that a plurality of data for the motor drive pulse is stored for each speed of the motor. During the process for the CPU 71 to execute operating programs, one of the data for motor drive pulse can be selected and set. The CPU 71 instructs the drive pulse generator 73 to generate drive pulse signals that correspond to the set motor driver pulse data. Through this configuration, the rotating speeds of the feed motor MT1 and the transport motor MT2 switch to the appropriate times and transport the original.

Drive pulse signals that are output from the drive pulse generator 73 are fed back to the CPU 71 which counts the number of the pulses. With the pulses, the system measures the amount that the original is transported to control the transport operation of the original and its transport speed.

Conventionally, an original feeding apparatus having the configuration described above is provided with a single side mode for reading only one side of the original, and the duplex mode for reading both sides thereof. These modes are set using an operation panel disposed on the original reading apparatus 1. Reading condition information such as color or black-and-white originals, and resolution set using the operation panel 75 disposed on the original reading apparatus 1 are obtained. Paper feed operations (described below) are changed according to this information.

Figure 7:
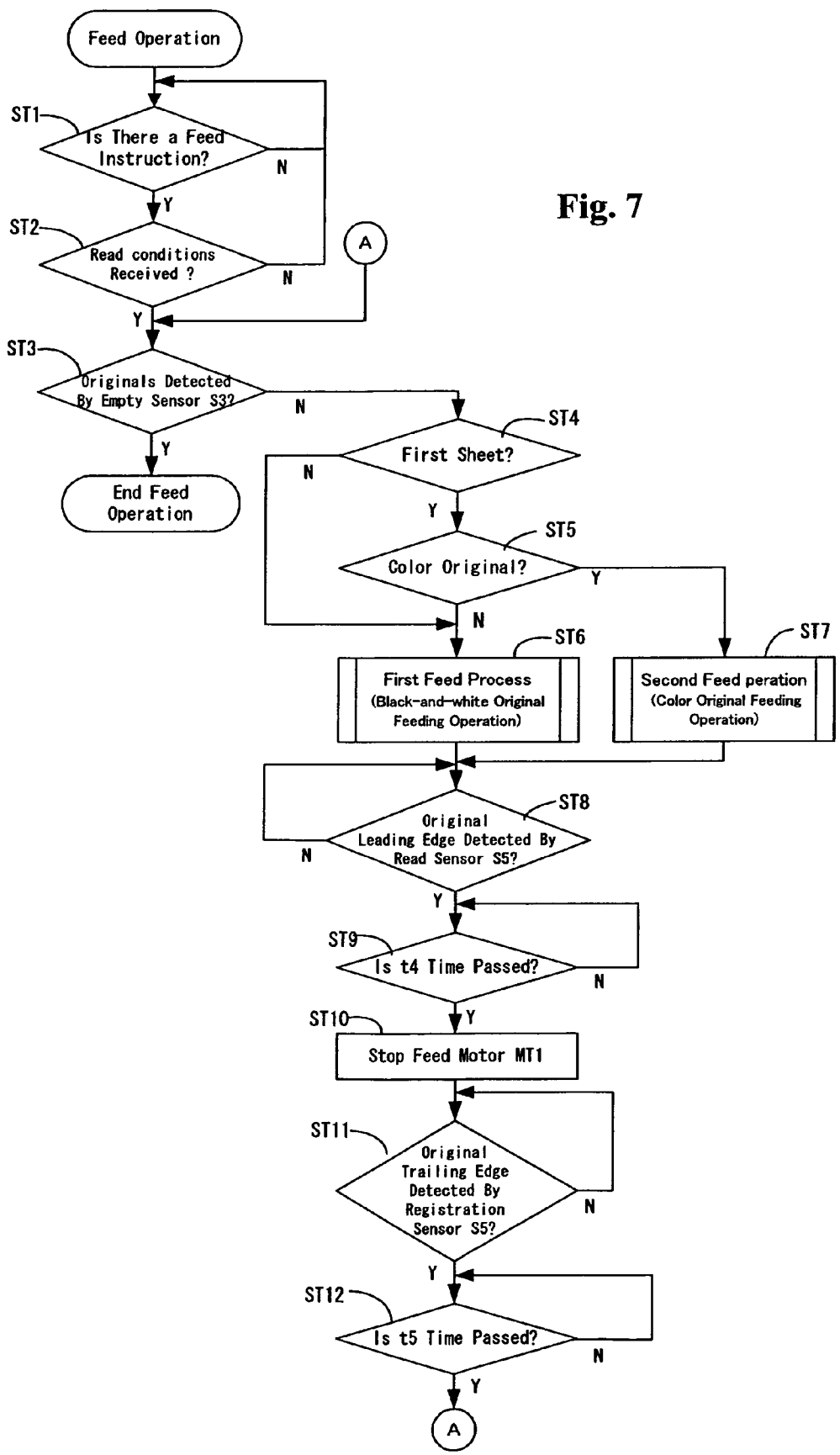
FIG. 7 is a flowchart of an original transport action of the original feeding apparatus.

An original transport operation from the feeder tray 22 to the second platen 4 in the single side mode will be explained with reference to FIG. 7. When the feeder receives a feed command and reading information (reading conditions) from the original reading apparatus, it is detected whether there are originals placed on the feeder tray 20 using the empty sensor S3 (ST1 to ST3).

If originals are detected to be stacked on the feeder tray 20, the following feeding operations are executed. Conversely, if no original is detected on the feeder tray 20, the step ends without performing these operations. If this situation occurs, a command is sent to the original reading apparatus 1 indicating that there are no originals stacked on the feeder tray.

When the empty sensor S3 detects an original stacked on the feeder tray 20, it is determined whether the original is the first (#1) original (ST4). If it is the first original, the first feeding process (black-and-white original feeding operation) is executed. On the other hand, if it is not the first original, and it is a second or subsequent original, the system determines whether information for reading a color original is included in the reading information obtained from the original reading apparatus 1. This judges whether the original is color (ST5). If the original is color, the second feeding process (color original feeding process) is executed. In other words, for originals that are not the first original or color originals, the first feeding process (black-and-white original feeding process) is executed. For color originals, the second feeding process is executed.

Figure 8:
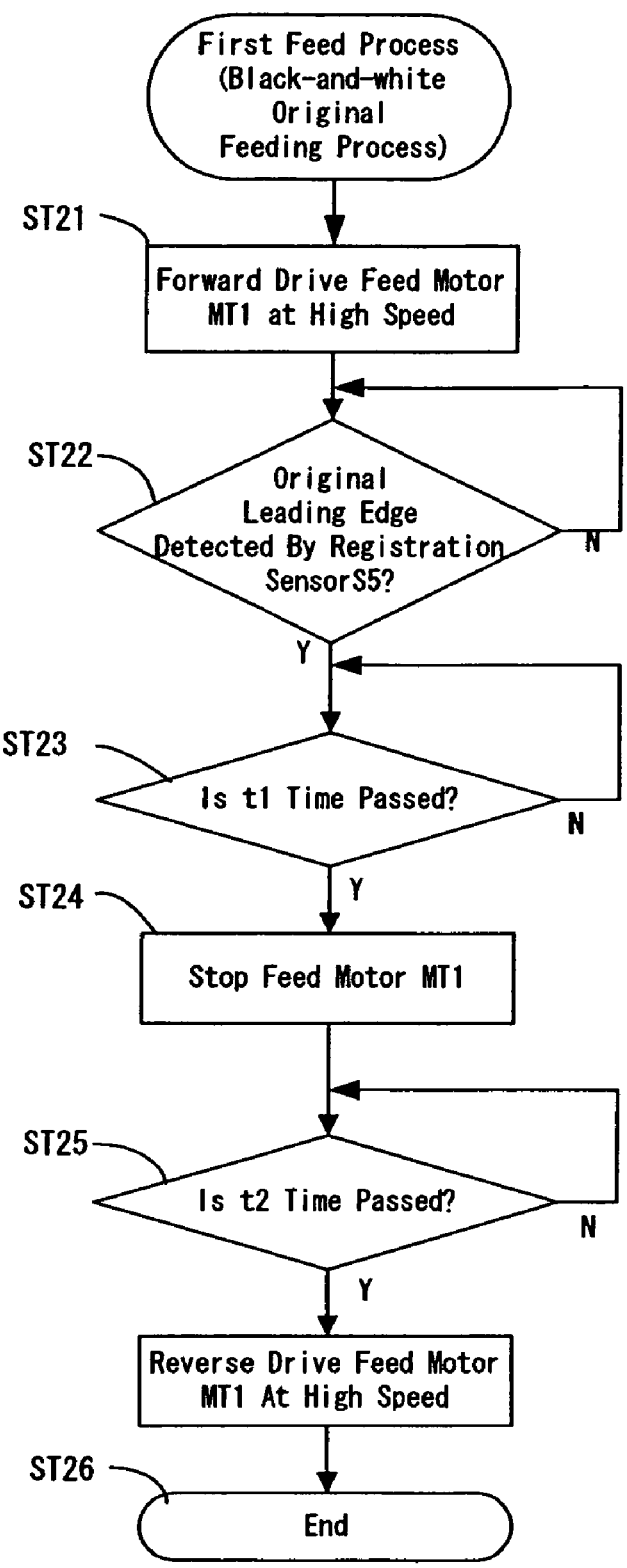
FIG. 8 is a flowchart of a first sheet feeding action of the original feeding apparatus.
Figure 9:
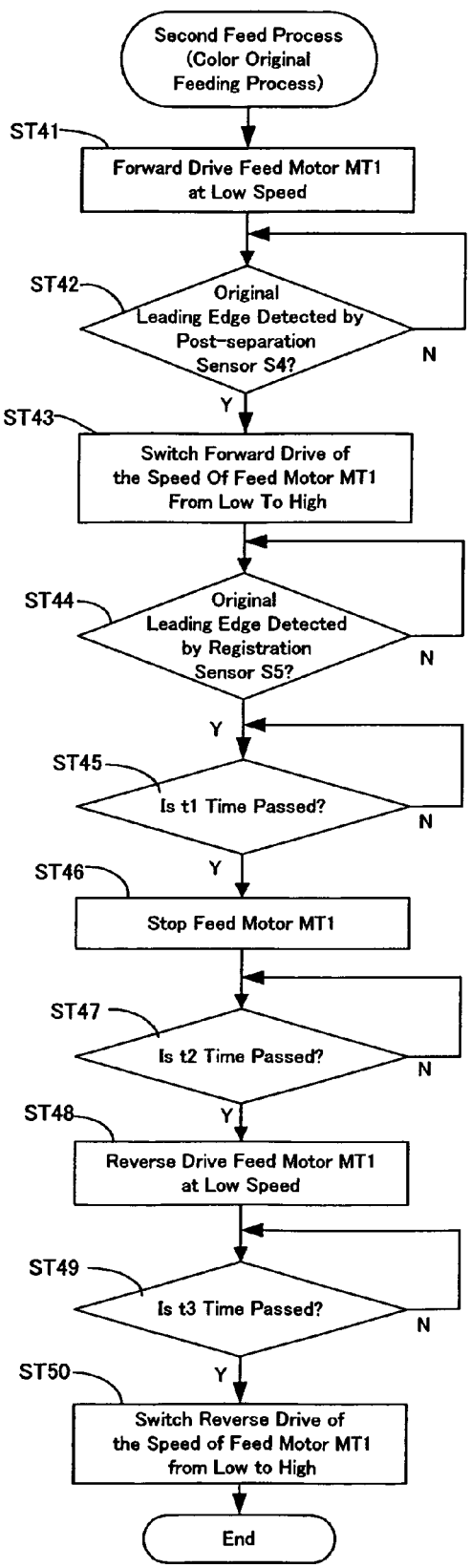
FIG. 9 is a flowchart of a second sheet feeding action of the original feeding apparatus.
Figure 10:
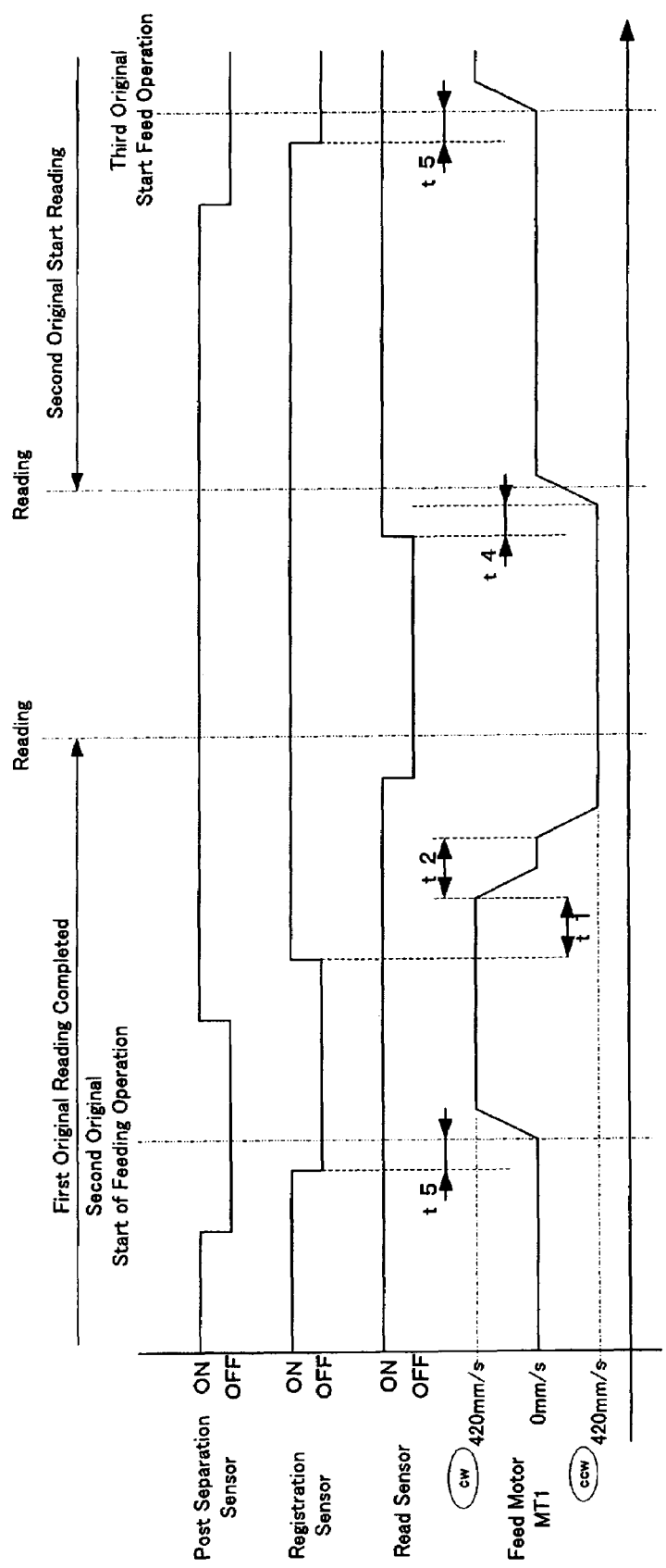
FIG. 10 is a timing chart of the first sheet feeding action of the original feeding apparatus.
Figure 11:
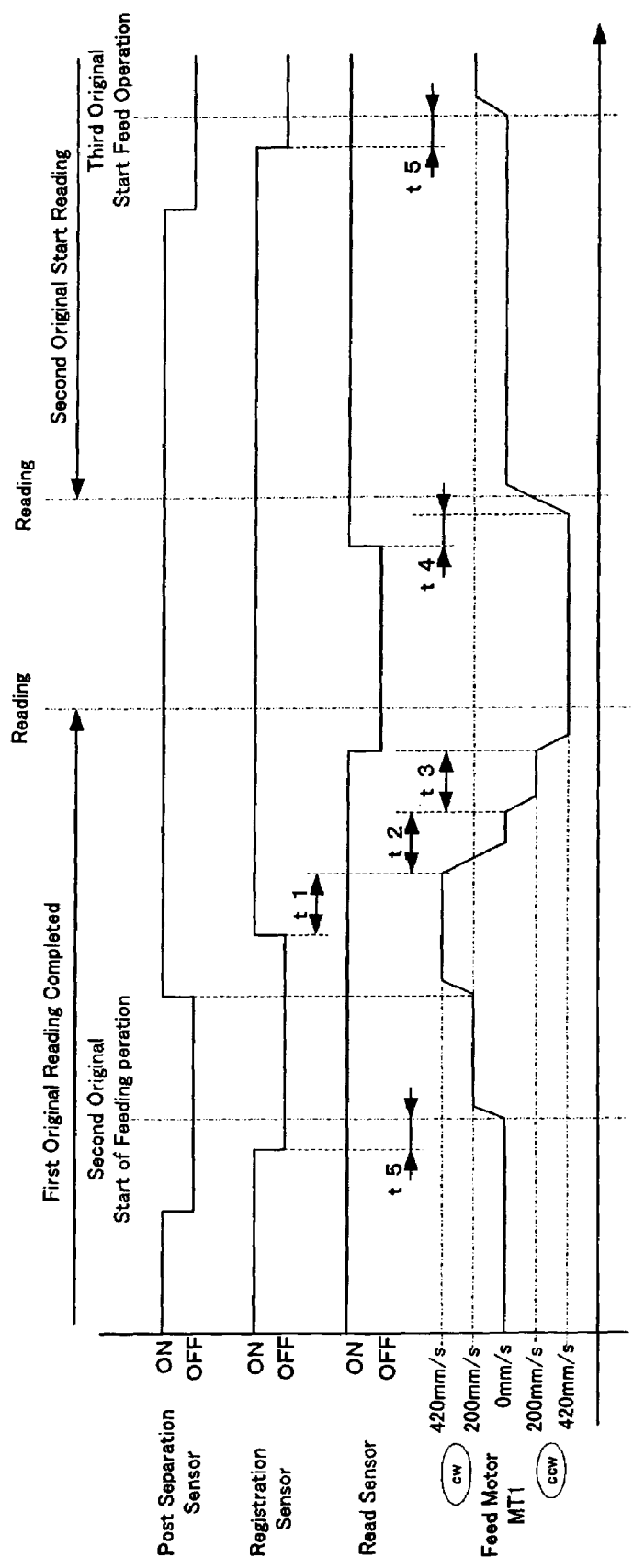
FIG. 11 is a timing chart of the second sheet feeding action of the original feeding apparatus.

FIG. 8 is an operation flowchart that outlines the first feeding process. FIG. 9 is an operation flowchart that outlines the second feeding process. FIG. 10 is a timing chart for the first feeding process. FIG. 11 is a timing chart for the second feeding process.

The first feeding process and the second feeding process shall proceed will be explained with reference to FIG. 8, FIG. 9, FIG. 10, and FIG. 11. First, the first feeding process (black-and-white original feeding process) will be explained. In this process, one of the plurality of motor driver pulse data that determines the drive speed of the feed motor MT1 and is stored in ROM 72 is selected to drive the motor in the forward direction (ST21). Here, data that drives the feed motor MT1 at a high-speed (original feed speed: 360 mm/sec) is selected for the motor driver pulse data.

This lowers the kick roller 32 at a high speed (360 mm/sec). It touches the uppermost surface of the original at which point the kick roller 32 and feed roller 33 rotate to kick the original from the feeder tray 20 at a speed of 360 mm/sec. At this time, the kick roller 32 and the paper feed roller 33 are rotated in the paper feed direction, but the pair of register rollers 35 does not rotate due to the action provided by the one-way clutch OW2.

Then, the leading edge of an original separated into a single sheet by the feed roller 33 and the separation pad 34 is detected by the register sensor S5. After a predetermined amount of time t1 after the detection, the feed motor MT1 is temporarily stopped (ST22 to ST24). At that time, the leading edge of the original enters a nipping point on the pair of register rollers 35, thereby forming a bend in the original. This aligns the leading edge of the original and removes any skew therein.

After it is once stopped, the feed motor MT1 reverses its drive to drive at a high-speed (original feed speed: 360 mm/sec) at a predetermined timing (after t2 has passed). Through this, the pair of register rollers 35 sends the original toward the transport in roller 42 of the transport unit 40 at the speed of 360 mm/sec (ST10 to ST11). Then, with the reverse rotational drive of the feed motor MT1, a kick roller 32 rises at a high speed (360 mm/sec) to a position separated from the original. At this time, the drive of the feed roller 33 is interrupted by the action of the one-way clutch OW1, thereby causing the reverse rotational drive from the feed motor MT1 not to be transmitted thereto.

At a predetermined amount of time t4 after the point where the leading edge of the original fed by the pair of register rollers 35 is detected by the read sensor S6, the feed motor MT1 stops, thereby stopping the pair of register rollers 35 (ST8 to ST10). This completes the feed operation of the first original. Note that at this time the leading edge of the original is already nipped by a pair of transport in rollers 42 and the original can be transported by the pair of transport in rollers 42 without interference even if the pair of register rollers 35 is stopped. The original fed by the pair of transport in rollers 42 passes over the reading position (described below). In that process, the reading device composed of the first, and the second carriage 11 and 12, and line sensors 13 reads the original.

After the amount of time t5 from the time that the register sensor S5 detects the trailing edge of the original (ST11 to ST12), the paper feed operation for a next original (a second original) is started while reading the original (the first original) with the reading device as shown in FIG. 10. The feeding operation judges whether there is an original on the feeder tray 20, in the same way as for the first original (ST3). It is judged that this is the next original when the empty sensor detects an original on the feeder tray 20. Then, the feed motor MT1 is driven in the forward direction at a high-speed (original feed speed: 360 mm/sec). When the kick roller 32 is lowered at a high speed (360 mm/sec), the kick roller 32 and feed roller 33 are rotated to kick out the next original. After this, the feeding of the second original proceeds in the same way as for the first original.

The feeding operation for the next original is executed while transporting and reading the prior original. At this time, the lowering of the kick roller 32 and the drive of the kick roller 32 and feed roller 33 are performed at a high speed. Accordingly, the next original can be sent consecutively to a reading position with a short gap relative to the prior original. Thus, it is possible to shorten the processing time of originals.

On the other hand, if no original is detected to be stacked on the feeder tray 20, all feeding operations are ended. Then, a command is sent to the original reading apparatus 1 indicating that the original currently being fed by transport unit 40 is the final original.

Then, the second feeding process (color original feeding process) is applied to the second and subsequent originals. In other words, after the amount of time of t5 from the time that the trailing edge of the first original is detected by the register sensor S5 (ST11 to ST12), the paper feed operation for a next original (a second original) is started while reading the original (the first original) as shown in FIG. 11. If color original reading information is included in the reading information (reading conditions) from the original reading apparatus 1, a second feeding process (color original feeding process) is executed.

With the second feeding process, the system selects motor drive pulse data that drives the feed motor MT1 at a low speed (original feeding speed: 200 mm/sec) from the plurality of motor drive pulse data that determines the drive speed of the feed motor MT1 and is stored in ROM 72. Accordingly, when the kick roller 32 kicks a second original from the feeder tray 20, the shock of striking the surface of the original does not affect the reading of images on the first original. The second feeding process controls the kick roller 32 to touch the surface of the original at a low speed (original feeding speed: 200 mm/sec).

The second feeding process will be explained next with reference to FIG. 7. The feed the motor MT1 drives in the forward direction (ST41) at a low speed (original feeding speed: 200 mm/sec) according to the motor drive pulse data. This lowers the kick roller 32 at a low speed (200 mm/sec). It touches the uppermost surface of the original at which point the kick roller 32 and feed roller 33 rotate to kick the original from the feeder tray 20 at a speed of 200 mm/sec.

Then, the leading edge of an original separated into a single sheet by the feed roller 33 and the separation pad 34 is detected by the separation sensor S4, at which point, the feed motor switches from a low speed to a high speed (original feeding speed: 360 mm/sec) (ST42 to ST43). This causes the original being fed by the kick roller 32 and feed roller 33 to change a speed from 200 mm/sec to 360 mm/sec.

After this, the feed motor MT1 is stopped after a predetermined amount of time t1 when the leading edge of the original is detected by the register sensor S5 (ST44 to ST47). This causes the leading edge of the original to enter the nipping portion of the pair of register rollers for alignment.

After it is stopped, the feed motor MT1 reverses its drive to drive at a low-speed (original feed speed: 200 mm/sec) at a predetermined timing (after t2 has passed; ST47 to ST48). Through this, the pair of register rollers 35 sends the original toward the transport in roller 42 of the transport unit 40 at the speed of 200 mm/sec. Then, with the reverse rotational drive of the feed motor MT1, the kick roller 32 rises at a low speed (200 mm/sec) to a position separated from the original, and the protrusion 32e on the swinging arm touches the restricting member 32c where the arm stops. At this time, the drive of the feed roller 33 is interrupted by the action of the one-way clutch OW1, thereby causing the reverse rotational drive from the feed motor MT1 not to be transmitted thereto.

Then, after t3 has passed after the reverse drive of the paper feed motor MT1, the motor switches from a low speed to a higher speed (original feed speed: 420 mm/sec; ST42 to ST43). This causes the original being fed by the pair of register rollers 35 to change a speed from 200 mm/sec to 420 mm/sec. Note that t3 is set to a time for the feed motor MT1 to drive in reverse to start raising the kick roller 32 until it reaches its upper limit position where the protrusion touches the restricting member 32c.

Then, returning to the feed operation flowchart shown in FIG. 6, after a predetermined amount of time t4 after the leading edge of the original being fed by the pair of register rollers 35 is detected by the read sensor S6, the feed motor MT1 stops (ST8 to ST10). This is the same as steps ST8 to ST13 described above. After that, the same operations are executed until there are no more originals left on the feeder tray 20.

As described above, in the second feeding process, the speed for the forward drive of the feed motor MT1 to kick out the originals is set to a speed that is lower than the normal original feeding operation (black-and-white original feeding operation). Specifically, the lowering speed of the kick roller 32 for feeding the color originals is controlled to be a speed that is lower in comparison to the originals that are not in color (black-and-white originals).

And this way, by setting the lowering speed of the kick roller 32 to read the color originals at a low speed, the shock of the kick roller 32 touching the uppermost surface of the original is alleviated. This, in turn, reduces the amount of blurring in the images on the original.

In the second feeding process, the speed for the reverse drive of the feed motor MT1 to feed the originals with the pair of register rollers 35 is set to a speed that is lower than the first feeding operation. Specifically, the rising speed of the kick roller 32 after feeding the color original is controlled to be a speed that is lower in comparison to the originals that are not in color (black-and-white originals).

And this way, by setting the raising speed and the lowering speed of the kick roller 32 to read the color originals to the low speed, the shock of the kick roller 32 touching the restricting member 32c is alleviated. This, in turn, reduces the amount of blurring in the images on the original.

With the second feeding process for feeding the color originals, the feed motor MT1 rotates in the forward direction at a low speed to lower the kick roller 32 at a speed that is lower than normal. This is controlled to switch the feed motor MT1 to a high-speed after the kick roller 32 touches the uppermost surface of an original. Through this, the kick roller 32 feeds an original at a high speed after it has touched the uppermost surface of the original, thereby shortening the interval from the previous original, and contributing greatly to shorten the original processing time. Also, according to the embodiment of the present invention, the system is controlled to drive the feed motor MT1 in reverse at a low speed to raise the kick roller 32 at a speed that is lower than normal, then to switch the feed motor MT1 to a high speed after the kick roller 32 touches the restricting member 32c to shorten the intervals of originals and the processing time for originals.

Note that in the embodiment, the system controls the feed motor MT1 to start and stop to a low speed then to switch to a high-speed by the detection of the leading edge of the original by the post-separation sensor S4. It is also perfectly acceptable that a low-speed is used only for a predetermined amount of time after starting the feed motor MT1, then switching to a high-speed after a predetermined amount of time. If a predetermined time is set to a long amount of time for the kick roller to move from its upper limit position to a position where it touches the upper surface of an original when two or more originals (the minimum number of stacked originals) are stacked on the feeder tray 20, the shock of the kick roller touching the uppermost surface of the originals is alleviated regardless of the amount of originals stacked on the feeder tray.

In the preferred embodiment of the present invention, the speed to lower the kick roller 32 is set to 360 mm/sec for the black-and-white originals, and to 200 mm/sec for the color originals. These values can be set to any values as far as they do not affect the speed for a predetermined number of sheets actually stacked on a feeder tray or the images that are actually read. Because the shock when feeding the last original stacked on a feeder tray affects images the most, the driving speed of the motor for black-and-white originals is set according to the tolerable image reading conditions. Conversely, the drive speed of the motor is set for the reading device of color originals.

An original transport operation and a discharge operation will be explained next. An original sequentially fed to the pair of transport in rollers 42 is transported to the reading position that is set on the top surface of the second platen 4 by the pair of transport in rollers 42 and the pair of transport out rollers 43, where the reading device reads images on the original. Then, the original read at the reading position of the second platen 4 is transported, and its leading edge pushes the flapper arranged to cover the discharge path 51 and is guided to the pair of discharge rollers 52. Then, the original is discharged to a discharge tray 21 by the pair of discharge rollers 52. Note that the pair of transport in rollers 42, the pair of transport out rollers 43, and the pair of discharge rollers 52 continue to drive until the final sheet is discharged to the discharge tray 21 by the pair of discharge rollers 52 when the transport motor MT2 starts simultaneously with the reverse drive of the feed motor MT1 when feeding the first original to the pair of transport in rollers 42 by the pair of register rollers 35.

Next, the duplex mode for reading images on both sides of an original will be explained. When the empty sensor S3 detects the originals are stacked on the feeder tray 20, the feed motor MT1 drives in the forward direction in the same way as when reading the first original in the single side mode, to rotate the kick roller 32 and the feed roller 33. The original enters the nipping point of the pair of register rollers 35 where any skew is removed. The feed motor MT1 drives in reverse to rotate the pair of register rollers 35, thereby sending the original to the pair of transport in rollers 42. Then, based on the detection of the leading edge of the original by the read sensor S6, the feed motor MT1 stops and the feeding operation ends.

The pair of transport in rollers 42 and the pair of transport out rollers 43 drive in the forward direction simultaneously to the reverse drive of the feed motor MT1 to receive the original from the pair of register rollers 35 and pass it over the second platen 4. At this point, the top surface (one side) of the original is read by the reading device at the reading position on the second platen 4.

The original is then guided to the discharge path 51 after it is read. Then, it is guided by the pair of discharge rollers 42 to the discharge tray 21. When the discharge sensor S7 detects the trailing edge of the original, the drive of the transport motor MT2 is stopped. This causes the trailing edge of the original to be stopped where it is nipped between the pair of discharge rollers 52.

After that, the feeding operation is executed again so that the backside of the original can be read. In this re-feeding operation, the discharge drive roller 24a is driven in reverse by the reverse drive from the transport motor MT2 to switch back the original that is stopped at the nipping point of the pair discharge rollers 52, and then is sent to the switchback path 61.

At a predetermined amount of time after the register sensor S5 detects the leading-edge of the original which is guided into the switchback path 61, the transport motor MT2 stops. At that time, the leading edge of the original enters a nipping point of the pair of register rollers 35, thereby forming a bend in the original. This aligns the leading edge of the original and removes any skew therein.

Then, the feed motor MT1 drives in reverse at a predetermined timing to rotate the pair of register rollers 35 in the paper feed direction. When the leading edge of the original is firmly nipped by the pair of register rollers 35, the pressing solenoid SOL is excited to cause the discharge follower roller 24b to move downwardly and separate from the discharge drive roller 24a. At that point, the transport motor MT2 drives in forward to rotate the pair of transport in rollers 42 and the pair of transport out rollers 43.

The original then is sent from the pair of register rollers 35 to the transport in rollers 42, and then transported over the second platen 4 by the pair of transport in rollers 42 and the pair of transport out rollers 43. Note that the feed motor MT1 is stopped when the original enters the nipping point of the pair of transport in rollers 42.

Then, the backside of the original transported to the second platen 4 by the pair of transport in rollers 42 and the pair of transport out rollers 43 is read by the reading device at the reading position on the second platen 4. Then, after the images on the original are read, the original is sent to the discharge roller 21 along the discharge path 51. At this time, the leading edge and the trailing edge pass each other in the common area of the discharge path 51 and the switchback path 61. The transport of the original is unhindered because the pair of discharge rollers 52 is separated.

Later, when the register sensor S5 detects the trailing edge of the original, the pair of discharge rollers 52 is separated by the excitation of the pressing solenoid SOL, and the drive of the transport motor MT2 stops at a predetermined amount of time after the discharge sensor S7 has detected the trailing edge of the original. The original thus stops with its trailing edge nipped by the pair of discharge rollers 52.

Then, to discharge the original with its pages reordered on the discharge tray 21, the transport motor MT2 is driven reverse in the same way as described above in relation to the re-feeding operation. This sends the original over the second platen 4 again to turn the original over from front to back and into the discharge path 51 via the switchback path 61. In this way, the original which is sent to the discharge path 51 is discharged to the discharge tray 21 by the discharge rollers 52.

When the register sensor S5 detects the trailing edge of the original while it is being transported to the discharge path 51, the empty sensor S3 detects the presence of an original on the feeder tray 20. If there is a next original, the system starts the feeding operation for the original. On the other hand, if there is not another original, all original processing is ended after the original that is currently being transported is discharged to the discharge tray 21.

In the embodiment of the present invention described above, the original reading apparatus that supports the color originals using the three line sensors is described. However, it is also possible to apply the invention to an original reading apparatus that supports only black-and-white originals and that enables the selection of a plurality of resolutions.

Specifically, if the resolution information obtained from the original reading apparatus 1 is for a low resolution (for example: 600 dpi), the system executes the first feeding operation described above. Conversely, if the resolution information received from the original reading apparatus 1 calls for a high resolution (for example: 1200 dpi), the system executes the second feeding process. If the resolution is set to be low, the rising operation of the kick roller is performed at a high speed to shorten the amount of time required for setting the originals. If the resolution is set to be high, the rising operation of the kick roller is performed at a low speed. This alleviates the shock that occurs when the kick roller comes into contact with the upper surface of an original and when it comes into contact with the restricting member. This enables the system to obtain good quality images. Thus, it is preferable to set the system to use the high-speed when the resolution is below a standard using 600 dpi or 800 dpi, or to use the low-speed if the resolution is higher than the standard. It is also acceptable to set the actual and lowering speed to an appropriate value in view of the speed for a preset stacking amount of sheets on a feeder tray and the same way for color originals and black-and-white originals and for the effect on images that are actually read.

The first feeding process and the second feeding process are selectable according to the information for black-and-white originals, color originals, high-resolution, or low resolution.

In other words, if the information obtained from the image reading apparatus 1 is for the black-and-white originals and a low resolution, the system will execute the first feeding process. Conversely, if the information obtained from the original reading apparatus 1 is for at least one of the color originals or a high resolution, the system will execute the second feeding process.

Furthermore, according to the aforementioned embodiment, the information regarding the image types being black-and-white or color set by the operation panel on the image reading apparatus 1 is received from the image reading apparatus 1. It is also perfectly acceptable to establish an ACS (auto-color selection) function to automatically identify the images of the original.

Note that it is possible to use a method for the ACS function to identify the images being black-and-white or color using the image data obtained from the first original by the reading device, or to establish sensors for identifying the black-and-white and color images in a guiding path from the feeder tray of the original feeding apparatus to the discharge tray.

In the embodiment, the method is explained for varying the speed of the feeding device such as a kick roller arranged above a tray when moving from the retracted position above the tray to the position where the feeding device touches an original on the tray to sequentially feed the originals from the feeder tray to the reading platen. This reduces the blurring or distortion caused by a vibration when the feeding device touches the surface of the original while reading the original according to the reading conditions. This allows the system to obtain highly precise images by slowly moving the feeding device to touch the originals at a low speed when reading color images or at a high resolution. If using a low resolution, or reading black-and-white originals, the feeding device touches the original at a high speed, thereby enabling a rapid series of feeding operations.

The disclosure of Japanese Patent Application No. 2004-115602, filed on Apr. 9, 2004, is incorporated in the application.

While the invention has been explained with reference to the specific embodiments of the invention, the explanation is illustrative and the invention is limited only by the appended claims.

What is claimed is:

1. An original feeding apparatus for consecutively feeding originals at a predetermined interval to a reading position for reading images on the originals, comprising:
    a feeder tray for stacking the originals,
    a feeding device contacting an uppermost original on the feeder tray for kicking out the uppermost original, said feeding device rising and lowering relative to the feeder tray,
    a drive device for raising and lowering the feeding device, and
    a control device for controlling the drive device to change a speed of the feeding device to contact the uppermost original on the feeder tray according to a reading condition,
    wherein said control device includes an information attaining device for obtaining reading information for reading the originals, said control device changing the speed of the feeding device contacting the uppermost original on the feeder tray according to the reading information obtained by the information attaining device.

2. An original feeding apparatus according to claim 1, further comprising a transport device for separating the originals kicked out by the feeding device into a single sheet and transporting the same.

3. An original feeding apparatus according to claim 2, wherein said control device controls the drive device so that the feeding device contacts the uppermost original at a first speed when the reading condition is for reading a black-and-white image, and the feeding device contacts the uppermost original at a second speed slower than the first speed when the reading condition is for reading a color image.

4. An original feeding apparatus according to claim 2, wherein said control device controls the drive device so that the feeding device contacts the uppermost original at a first speed when the feeding device kicks out a first original, and the feeding device contacts the uppermost original at a second speed slower than the first speed when the feeding device kicks out a second or subsequent original fed after the first original.

5. An original feeding apparatus according to claim 2, further comprising a restricting device arranged at a retracted position away from the uppermost original on the feeder tray for contacting and stopping the feeding device at the retracted position, said control device controlling the drive device to change a speed of the feeding device to contact the restricting device according to the reading condition.

6. An original feeding apparatus according to claim 1, wherein said control device includes a memory unit for storing a plurality of speed data for driving the driving device, said control device selecting one of the plurality of speed data according to the reading information obtained by the information attaining device to move the feeding device to a feeding position at a selected speed where the feeding device contacts the uppermost original.

7. An original feeding apparatus according to claim 6, further comprising a restricting device arranged at a retracted position away from the uppermost original on the feeder tray for restricting movement of the feeding device at the retracted position, said control device selecting one of the plurality of speed data according to the reading information to move the feeding device at a selected speed to contact the restricting device.

8. An original feeding apparatus for consecutively feeding originals at a predetermined interval to a reading position for reading images on the originals, comprising:
    a feeder tray for stacking the originals,
    a feeding device contacting an uppermost original on the feeder tray for kicking out the uppermost original, said feeding device rising and lowering relative to the feeder tray,
    a drive device for raising and lowering the feeding device,
    a control device for controlling the drive device to change a speed of the feeding device to contact the uppermost original on the feeder tray according to a reading condition, and
    a transport device for separating the originals kicked out by the feeding device into a single sheet and transporting the same,
    wherein said control device controls the drive device so that the feeding device contacts the uppermost original at a first speed when the reading condition includes a first reading resolution lower than a predetermined resolution, and the feeding device contacts the uppermost original at a second speed slower than the first speed when the reading condition includes a second reading resolution higher than the predetermined resolution.

9. An original reading apparatus for reading an original fed to a reading position, comprising:

a feeder tray for stacking the original, a kick roller contacting the original on the feeder tray for kicking out from the feeder tray, said kick roller rising and lowering relative to the feeder tray, a drive motor for raising and lowering the kick roller whenever the kicking roller kicks out the original, a feed roller for separating originals kicked out by the kick roller into a single sheet, a pair of transport rollers for transporting the original fed by the feed roller to the reading position, a reading device for reading the original transported by the pair of transport rollers at the reading position, and a control device for controlling the drive motor while the reading device is reading the original so that the kick roller contacts the original on the feeder tray, said control device controlling the drive motor such that the kicking roller contacts the original at a first speed when a reading condition is for reading a black-and-white image or a reading resolution is lower than a predetermined resolution, and the kicking roller contacts the original at a second speed slower than the first speed when the reading condition is for reading a color image or the reading resolution is higher than the predetermined resolution.

10. An original feeding apparatus according to claim 9, further comprising an operation device for inputting and setting the reading condition, said control device obtaining the reading condition set by the operation device.

11. An original feeding apparatus according to claim 9, further comprising a drive transmission device for operating the kick roller and the feed roller such that when the drive motor rotates forward, the kick roller is lowered to contact the original, and the kick roller and the feed roller are operated, and when the drive motor rotates in reverse, the kick roller is raised in a direction away from the original.

12. An original feeding apparatus according to claim 11, wherein said control device controls the drive motor to increase a rotational speed thereof after the kick roller contacts the original when the reading condition is for reading the color image, or the reading resolution is higher than the predetermined resolution.

* * * * *